(12) United States Patent
Wang et al.

(10) Patent No.: US 12,287,432 B2
(45) Date of Patent: Apr. 29, 2025

(54) PHASED ARRAY LiDAR TRANSMITTING CHIP OF MIXED MATERIALS, MANUFACTURING METHOD THEREOF, AND LIDAR DEVICE

(71) Applicant: VANJEE TECHNOLOGY CO., LTD., Beijing (CN)

(72) Inventors: Pengfei Wang, Beijing (CN); Yang Xu, Beijing (CN); Yejin Zhang, Beijing (CN); Hongyan Yu, Beijing (CN); Jiaoqing Pan, Beijing (CN); Qingfei Wang, Beijing (CN); Linyan Tian, Beijing (CN)

(73) Assignee: VANJEE TECHNOLOGY CO., LTD., Beijing (CN)

( * ) Notice: Subject to any disclaimer, the term of this patent is extended or adjusted under 35 U.S.C. 154(b) by 1247 days.

(21) Appl. No.: 17/039,722

(22) Filed: Sep. 30, 2020

(65) Prior Publication Data

US 2021/0018597 A1    Jan. 21, 2021

Related U.S. Application Data

(63) Continuation of application No. PCT/CN2019/112399, filed on Oct. 22, 2019.

(30) Foreign Application Priority Data

Nov. 27, 2018   (CN) .......................... 201811423751.9

(51) Int. Cl.
*G01S 7/484*   (2006.01)
*G01S 7/4863*   (2020.01)
(Continued)

(52) U.S. Cl.
CPC ............ *G01S 7/484* (2013.01); *G01S 7/4863* (2013.01); *G01S 17/89* (2013.01);
(Continued)

(58) Field of Classification Search
CPC ........ G01S 7/484; G01S 7/4863; G01S 17/89; G01S 7/4814; G01S 17/42; G01S 7/4817;
(Continued)

(56) References Cited

U.S. PATENT DOCUMENTS

| 2014/0192394 A1 | 7/2014 | Sun |
| 2014/0269800 A1 | 9/2014 | Purnawirman |

(Continued)

FOREIGN PATENT DOCUMENTS

| CN | 101142505 A | 3/2008 |
| CN | 101395480 A | 3/2009 |

(Continued)

OTHER PUBLICATIONS

International Search Report.
(Continued)

*Primary Examiner* — Luke D Ratcliffe
(74) *Attorney, Agent, or Firm* — J.C. PATENTS

(57) ABSTRACT

The present disclosure provides a phased array LiDAR transmitting chip of mixed materials, a manufacturing method thereof, and a LiDAR device. The phased array LiDAR transmitting chip of mixed materials includes: a first material structure layer and an SOI silicon waveguide structure layer, the first material structure layer is optically connected to the SOI silicon waveguide structure layer through a coupling connection structure; the first material structure layer is configured to couple input light into the chip; the coupling connection structure is configured to split a light wave coupled to the chip, and couple each of split light waves into a corresponding silicon waveguide in the SOI silicon waveguide structure layer; where a non-linear refractive index of the first material in the first material structure layer is lower than a non-linear refractive index of silicon material.

14 Claims, 6 Drawing Sheets

(51) Int. Cl.
*G01S 17/89* (2020.01)
*G02B 6/12* (2006.01)
*G02B 6/293* (2006.01)
*H01S 3/23* (2006.01)
*H04B 10/50* (2013.01)

(52) U.S. Cl.
CPC ........ *G02B 6/29382* (2013.01); *H01S 3/2391* (2013.01); *H04B 10/506* (2013.01); *G02B 2006/12164* (2013.01)

(58) Field of Classification Search
CPC ..... G01S 7/481; G01S 7/483; G02B 6/29382; G02B 2006/12164; G02B 6/12004; G02B 2006/12107; H01S 3/2391; H04B 10/506; G02F 1/292
See application file for complete search history.

(56) References Cited

U.S. PATENT DOCUMENTS

| | | | |
|---|---|---|---|
| 2015/0340765 | A1 | 11/2015 | Dang |
| 2016/0301477 | A1 | 10/2016 | Orcutt |

FOREIGN PATENT DOCUMENTS

| | | | | | |
|---|---|---|---|---|---|
| CN | 101957534 | A | | 1/2011 | |
| CN | 102496851 | A | | 6/2012 | |
| CN | 103119734 | A | | 5/2013 | |
| CN | 104122636 | A | | 10/2014 | |
| CN | 106501776 | A | | 3/2017 | |
| CN | 106908776 | A | | 6/2017 | |
| CN | 107611775 | A | | 1/2018 | |
| CN | 108563083 | A | | 9/2018 | |
| CN | 108767656 | A | | 11/2018 | |
| CN | 108828712 | A | | 11/2018 | |
| CN | 209373098 | U | * | 9/2019 | ............ G01S 7/481 |
| GB | 2523383 | A | | 8/2015 | |

OTHER PUBLICATIONS

Notice of allowance of the priority Chinese application No. 201811423751.9.
Extended Search Report of EP198882755.
NPL: "Efficient adiabatic silicon-on-insulator waveguide taper", Photonics Research. vol. 2, No. 3, Jun. 2014, pp. A41-A44.
First Office Action of the priority Chinese application.
NPL: "Research on Coherent Encoding Signal for All-Optical Wavelength Conversion Using the Silicon Waveguide", by Xiaoyan Wang, Chinese Doctoral Dissertations & Master's Theses Full-text Database (Doctor), Information Science and Technology, vol. 3, 2018.

* cited by examiner

PHASED ARRAY LiDAR TRANSMITTING CHIP OF MIXED MATERIALS, MANUFACTURING METHOD THEREOF, AND LIDAR DEVICE

CROSS-REFERENCE TO RELATED APPLICATIONS

This application is a continuation of International Application No. PCT/CN2019/112399, which was filed on Oct. 22, 2019, and which claims priority of Chinese Patent Application No. 201811423751.9 filed on Nov. 27, 2018. The contents of the above applications are incorporated herein by reference in their entireties.

TECHNICAL FIELD

The present disclosure relates to the field of light detection and ranging (LiDAR) technologies and, in particular, to a phased array LiDAR transmitting chip of mixed materials, a manufacturing method thereof, and a LiDAR device.

BACKGROUND

The concept of phased array LiDAR has been proposed for a long time, and various design schemes are also being developed. Current phased array LiDAR chips use silicon on insulator (SOI) material as a substrate, thereby realizing the basic functions of LiDAR.

But silicon has its own shortcomings. Since silicon is a strongly nonlinear material with a strong two-photon absorption effect and a free carrier absorption effect, and its low-order nonlinear refractive index is very large, high-power light is difficult to transmit in a silicon waveguide with low loss, which greatly limits the optical power input to the phased array LiDAR transmitting chip, and seriously affects the detection performance of the LiDAR and brings great pressure to the signal detection part.

SUMMARY

The present disclosure provides a phased array LiDAR transmitting chip of mixed materials, a manufacturing method thereof, and a LiDAR device, in order to solve the power limit problem of a phased array LiDAR chip in the prior art, so that the optical power input into the phased array LiDAR transmitting chip can be greatly increased, thereby improving the detection performance of LiDAR, and reducing the pressure on the signal detection part.

In a first aspect, an embodiment of the present disclosure provides a phased array LiDAR transmitting chip of mixed materials, including: a first material structure layer and an SOI silicon waveguide structure layer, where an overlapping region of a rear end of the first material structure layer and a front end of the SOI silicon waveguide structure layer forms a coupling connection structure;
  the first material structure layer is optically connected to the SOI silicon waveguide structure layer through the coupling connection structure;
  the first material structure layer is used for to couple input light into the chip;
  the coupling connection structure is configured to split a light wave coupled into the chip, and couple each of split light waves into a corresponding silicon waveguide in the SOI silicon waveguide structure layer;
  where a non-linear refractive index of a first material in the first material structure layer is lower than a non-linear refractive index of a silicon material.

Further, in an implementation of the phased array LiDAR transmitting chip of mixed materials, the SOI silicon waveguide structure layer includes: a plurality of silicon coupling waveguides of the coupling connection structure, phase modulators and an optical antenna;
  the plurality of silicon coupling waveguides of the coupling connection structure, the phase modulators and the optical antenna are connected through silicon waveguides;
  each of the phase modulators is configured to change a phase of a light wave coupled into a corresponding silicon waveguide in the SOI silicon waveguide structure layer; and
  the optical antenna is configured to transmit phase-changed light waves in silicon waveguides into space.

Further, in an implementation of the phased array LiDAR transmitting chip of mixed materials, the first material structure layer is located above the SOI silicon waveguide structure layer, and the first material structure layer and the SOI silicon waveguide structure layer are separated by a second material layer;
  where a refractive index of the second material layer is lower than that of the first material structure layer and the SOI silicon waveguide structure layer.

Further, in an implementation of the phased array LiDAR transmitting chip of mixed materials, the first material structure layer includes: an input coupler, a first material backbone waveguide, and a first material coupling waveguide of the coupling connection structure;
  the input coupler is optically connected to the first material coupling waveguide of the coupling connection structure through the first material backbone waveguide;
  the input coupler is configured to couple the input light into the first material backbone waveguide; and
  the first material backbone waveguide is configured to transmit a light wave to the first material coupling waveguide of the coupling connection structure.

Further, in an implementation of the phased array LiDAR transmitting chip of mixed materials, the coupling connection structure includes: the first material coupling waveguide and the plurality of silicon coupling waveguides;
  the first material coupling waveguide is connected to a rear end of the first material backbone waveguide, and each silicon coupling waveguide is connected to a front end of a corresponding silicon waveguide of the SOI silicon waveguide structure layer;
  the plurality of silicon coupling waveguides are equidistantly arranged directly below the first material coupling waveguide, along a direction of light transmission in the first material coupling waveguide; and
  a portion of each silicon coupling waveguide where the silicon coupling waveguide is coupled with the first material coupling waveguide has a tapered trapezoidal end, and a taper direction of the tapered end is opposite to the direction of light transmission in the first material coupling waveguide.

Further, in an implementation of the phased array LiDAR transmitting chip of mixed materials, a vertical distance between the first material coupling waveguide and each silicon coupling waveguide is 0 to 5 μm;
  a width of the trapezoidal end of each silicon coupling waveguide is 100 to 1000 nm;

a width of the first material coupling waveguide is the same as a width of the first material backbone waveguide, and a rear end width of each silicon coupling waveguide is the same as a width of the corresponding silicon waveguide in the SOI silicon waveguide structure layer; and a length of an overlapping region of each silicon coupling waveguide and the first material coupling waveguide is 0 to 100 μm.

In a second aspect, an embodiment of the present disclosure provides a phased array LiDAR device, which includes the phased array LiDAR transmitting chip of mixed materials according to the first aspect or any implementation of the first aspect described above.

In a third aspect, an embodiment of the present disclosure provides a method for manufacturing a phased array LiDAR transmitting chip of mixed materials according to the first aspect or any implementation of the first aspect, the method including:

forming an SOI silicon waveguide structure layer in a first region above a top silicon layer of the SOI substrate, where the SOI silicon waveguide structure layer includes a plurality of silicon coupling waveguides, phase modulators and an optical antenna;

forming a first material structure layer in a second region above the top silicon layer of the SOI substrate, where the first material structure includes an input coupler, a first material backbone waveguide and a first material coupling waveguide, and the first material coupling waveguide overlaps with the plurality of silicon coupling waveguides to form a coupling connection structure;

where a non-linear refractive index of a first material in the first material structure layer is lower than that of silicon.

Further, in an implementation of the method described above, the forming an SOI silicon waveguide structure layer in a first region above a top silicon layer of an SOI substrate includes:

transferring a first waveguide pattern to the top silicon layer of the SOI substrate by using an electron beam exposure process or a stepper lithography process, and etching the SOI silicon waveguide structure layer in the first region by using an inductively coupled plasma (ICP) etching process to form the plurality of silicon coupling waveguides and waveguide part of the phase modulators and the optical antenna.

Further, in an implementation of the method described above, the forming an SOI silicon waveguide structure layer in a first region above a top silicon layer of an SOI substrate further includes:

transferring a grating pattern to the top silicon layer of the SOI substrate by using the electron beam exposure process or the stepper lithography process, and etching a grating by using the ICP etching process to fabricate the optical antenna;

Further, in an implementation of the method described above, after transferring the grating pattern to the top silicon layer of the SOI substrate by using the electron beam exposure process or the stepper lithography process, and etching the grating layer to manufacture the optical antenna by using the ICP etching process, the method further includes:

growing a second material layer on the chip by using a plasma enhanced chemical vapor deposition (PECVD) process, where the first material structure layer is located above the SOI silicon waveguide structure layer, and the first material structure layer and the SOI silicon waveguide structure layer are separated by the second material layer;

where a refractive index of the second material layer is lower than that of the first material structure layer and the SOI silicon waveguide structure layer.

Further, in an implementation of the method described above, the forming a first material structure layer in a second region above the top silicon layer of the SOI substrate, includes:

growing a first material layer in the second region above the second material layer by using the PECVD process;

transferring a second waveguide pattern to the first material layer by using the electron beam exposure process or the stepper lithography process, and fabricating the first material structure layer in the second region by using the ICP etching process, to form the input coupler, the first material backbone waveguide and the first material coupling waveguide.

Further, in an implementation of the method described above, before growing the second material layer on the chip by using the PECVD process, the method further includes:

performing ion implantation in a phase modulation region of the SOI silicon waveguide structure layer for fabricating first phase modulators;

after transferring the second waveguide pattern to the first material layer by using the electron beam exposure process or the stepper lithography process, and fabricating the first material structure layer in the second region by using the ICP etching process, the method further includes:

growing an optical isolation layer on the chip by using the PECVD process;

etching through holes by using the ICP etching process, where the through holes lead to the ion implantation region in the SOI silicon waveguide structure layer, and growing an electrode metal material by using a magnetron sputtering process or a thermal evaporation process, and etching metal leads and electrodes by using a lithographic process to form the first phase modulators;

growing a protective layer on the chip by using the PECVD process; and etching electrode windows and a grating window by using the ICP etching process.

Further, in an implementation of the method described above, after the forming a first material structure layer in a second region above the top silicon layer of the SOI substrate, the method further includes:

growing an optical isolation layer on the chip by using the PECVD process;

growing a heating metal material and an electrode metal material by using a magnetron sputtering process or a thermal evaporation process, and etching thermodes, metal leads and electrodes by using a lithographic process, to form second phase modulators;

growing a protective layer on the chip by using the PECVD process; and etching electrode windows and a grating window by using the ICP etching process.

Embodiments of the present disclosure provides a phased array LiDAR transmitting chip of mixed materials, a manufacturing method thereof, and a LiDAR device. The phased array LiDAR transmitting chip of mixed materials includes: a first material structure layer and an SOI silicon waveguide structure layer, and an overlapping region of a rear end of the first material structure layer and a front end of the SOI silicon waveguide structure layer forms a coupling connection structure. The first material structure layer is optically connected to the SOI silicon waveguide structure layer through the coupling connection structure, and the first material structure layer is configured to couple input light into the chip. The coupling connection structure is configured to split a light wave coupled to the chip, and couple each of split light waves into a corresponding silicon waveguide in the SOI silicon waveguide structure layer, where a non-linear refractive index of the first material in the first material structure layer is lower than a non-linear refractive index of silicon material. Because the non-linear refractive index of the first material of the first material structure layer is lower than the non-linear refractive index of silicon, the first material structure layer can couple high-power input light to the chip, and then divide the light into several light waves through the coupling connection structure, so as to reduce the optical power and enable each light wave to transmit normally in the silicon waveguide. As a result, the optical power input into the phased array LiDAR transmitting chip of mixed materials can be greatly increased, thereby improving the detection performance of LiDAR, and reducing a lot of pressure on the signal detection part.

It should be understood that what is described in the summary above is not intended to limit key features or important features of the embodiments of the present disclosure, nor is it intended to limit the scope of the present disclosure. Other features of the present disclosure will be easily understood from the following description.

BRIEF DESCRIPTION OF DRAWINGS

In order to make the technical solutions in embodiments of the present disclosure or in the prior art clearer, the accompanying drawings used in the description of embodiments of the present disclosure or the prior art are briefly described hereunder. Obviously, the described drawings are merely some embodiments of present disclosure. For persons of ordinary skill in the art, other drawings may be obtained based on these drawings without any creative efforts.

REFERENCE NUMERALS IN DRAWING

Figure 1:
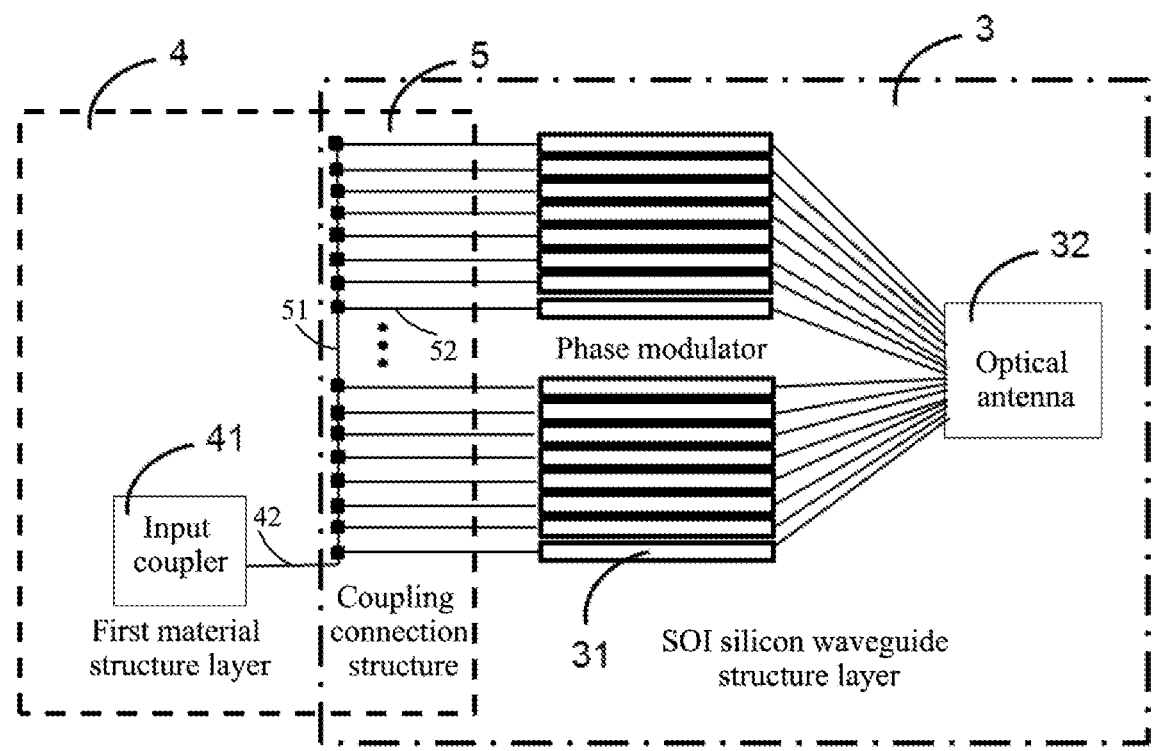
FIG. 1 is a structure diagram of a phased array LiDAR transmitting chip of mixed materials according to a first embodiment of the present disclosure.

1 Substrate silicon layer
2 Buried oxide layer
21 Top silicon layer
3 SOI Silicon waveguide structure layer
30 First region
31 Phase modulator
32 Optical antenna
4 First material structure layer
40 Second region
41 Input coupler
42 First material backbone waveguide
5 Coupling connection structure
51 First material coupled waveguide
52 Silicon coupled waveguide
6 Second material layer
7 Grating
8 Optical isolation layer
9 Electrode
10 Thermode
11 Metal lead
12 Protective layer
13 Electrode window
14 Grating window

DESCRIPTION OF EMBODIMENTS

Embodiments of the present disclosure will be described in further details in the following with reference to the accompanying drawings. Although some embodiments of the present disclosure are shown in the drawings, it should be understood that the present disclosure can be implemented in various forms and should not be construed as being limited to the embodiments described below. Rather, these embodiments are provided for a more thorough and complete understanding of the present disclosure. It should be understood that the drawings and embodiments of the present disclosure are only for exemplary purposes, and are not intended to limit the protection scope of the present disclosure.

The terms "first", "second", "third", "fourth", and the like (if any) in the description and claims of the embodiments of the present disclosure and the above-mentioned drawings are used to distinguish similar objects, and it does not set a specific order or sequence. It should be understood that the data used in this way are interchangeable under appropriate circumstances, so that the embodiments described herein can be implemented out of the order illustrated or described herein. In addition, the terms "including" and "having" and any of their variations are intended to cover non-exclusive inclusion.

First Embodiment

FIG. 1 is a structure diagram of a phased array LiDAR transmitting chip of mixed materials according to a first embodiment of the present disclosure. As shown in FIG. 1, the present embodiment provides a phased array LiDAR transmitting chip of mixed materials, which includes: a first material structure layer 4 and an SOI silicon waveguide structure layer 3, where an overlapping region of a rear end of the first material structure layer 4 and a front end of the SOI silicon waveguide structure layer 3 forms a coupling connection structure 5, and the first material structure layer 4 is optically connected to the SOI silicon waveguide structure layer 3 through the coupling connection structure 5.

Optionally, the first material structure layer 4 is configured to couple input light into the chip. The coupling connection structure 5 is configured to split a light wave coupled into the chip, and couple each of split light waves into a corresponding silicon waveguide in the SOI silicon waveguide structure layer 3.

A non-linear refractive index of a first material in the first material structure layer 4 is lower than a non-linear refractive index of a silicon material. In some implementations, the first material may be a material compatible with a complementary metal oxide semiconductor (CMOS) process. The term "non-linear refractive index" refers to low-order non-linear refractive indexes, for example, the first-order non-linear refractive index, the second-order non-linear refractive index, the third-order non-linear refractive index, etc.

Figure 6:
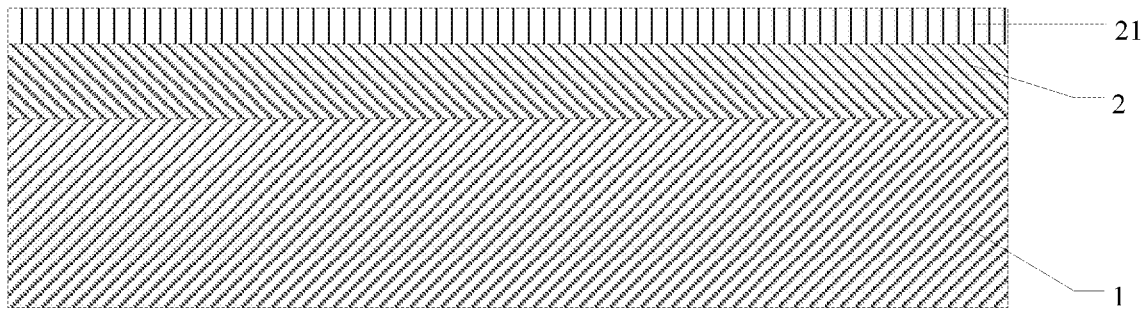
FIG. 6 is a structure diagram of an SOI substrate according to the seventh embodiment of the present disclosure.

Optionally, in this embodiment, the phased array LiDAR transmitting chip of mixed materials is integrated on an SOI substrate satisfying the CMOS process. As shown in FIG. 6, the SOI substrate includes a substrate silicon layer 1, a buried oxide layer 2 and a top silicon layer 21 from bottom to top. The material and thickness of each layer of the SOI substrate are not limited in the embodiment. For example, the material and thickness of each layer can be customized according to different needs, or a conventional standard CMOS process SOI substrate product can be used. For example, the material of the substrate silicon layer 1 is silicon with a thickness of 500 to 600 μm. The material of the oxide layer 2 is silicon dioxide with a thickness of 2 μm, and the material of the top silicon layer 21 is silicon with a thickness of 220 nm or 340 nm.

For the convenience of description, the following embodiments will use the above-mentioned standard CMOS process SOI substrate to integrate the phased array LiDAR transmitting chip of mixed materials of the embodiments of the present disclosure, where the thickness of the top silicon layer 21 is 220 nm.

Because silicon has a large low-order non-linear refractive index, and the silicon material has a strong two-photon absorption effect and free carrier absorption effect, so generally the optical power allowed to be transmitted in silicon waveguides is very small, usually about 100 mw. This makes a conventional pure silicon-based phased array LiDAR transmitting chip unable to achieve on-chip processing and emission of high-power lasers, which seriously reduces the detection effect of the LiDAR.

In order to solve the above problems, in this embodiment, the first material structure layer 4 is made of a first material that has a lower nonlinear refractive index than that of silicon and is compatible with the CMOS process. The first material may be a silicon-like material, such as silicon nitride or silicon oxynitride. For example, the first-order nonlinear refractive index of silicon nitride is nearly 10 times smaller than that of silicon, and it is not easily affected by the two-photon absorption effect or the carrier absorption effect. Therefore, the first material structure layer 4 can couple high-power input light into the first material structure layer 4. This makes the optical power that can be normally transmitted in the waveguide of the first material structure layer 4 much higher than that of the silicon waveguide.

In this embodiment, the coupling connection structure 5 splits the light coupled to the chip, and the light coupled into the input coupler 41 is divided into a plurality of light waves, so that the optical power of each light wave after splitting is much lower than the light coupled to the chip. When the light is divided into a plurality of light waves, the optical power of each light wave is small enough so that each light wave can be transmitted normally in the silicon waveguide. After that, each light wave is coupled into a corresponding silicon waveguide in the SOI silicon waveguide structure layer 3 through the coupling connection structure 5.

The present embodiment provides a phased array LiDAR transmitting chip of mixed materials, including: a first material structure layer 4 and an SOI silicon waveguide structure layer 3, and an overlapping region of a rear end of the first material structure layer 4 and a front end of the SOI silicon waveguide structure layer 3 forms a coupling connection structure 5. The first material structure layer 4 is optically connected to the SOI silicon waveguide structure layer 3 through the coupling connection structure 5, and the first material structure layer 4 is configured to couple input light into the chip. The coupling connection structure 5 is configured to split a light wave coupled into the chip, and couple each of split light waves into a corresponding silicon waveguide in the SOI silicon waveguide structure layer 3, where a non-linear refractive index of a first material in the first material structure layer 4 is lower than a non-linear refractive index of a silicon material. Because the non-linear refractive index of the first material of the first material structure layer 4 is lower than the non-linear refractive index of silicon, the first material structure layer 4 can couple high-power input light to the chip, and then divide the light into a plurality of light waves through the coupling connection structure 5, so as to reduce the optical power and enable each light wave to be transmitted normally in the silicon waveguide. As a result, the optical power input into the phased array LiDAR transmitting chip of mixed materials can be greatly increased, thereby improving the detection performance of LiDAR, and reducing a lot of pressure on the signal detection part.

Further, in present embodiment, the first material structure layer includes: an input coupler 41, a first material backbone waveguide 42, and a first material coupling waveguide 51 of the coupling connection structure 5.

The input coupler 41 is optically connected to the first material coupling waveguide 51 of the coupling connection structure 5 through the first material backbone waveguide 42. The input coupler 41 is configured to couple input light into the first material backbone waveguide 42, and the first material backbone waveguide 42 is configured to transmit the light wave to the first material coupling waveguide 51 of the coupling connection structure 5.

Specifically, in the present embodiment, the first material structure layer 4 includes: the input coupler 41, the first material backbone waveguide 42 and the first material coupling waveguide 51 of the coupling connection structure 5. When the first material is a material with a relatively low refractive index (for example, silicon nitride), then the size of the input coupler 41 formed by the first material is larger than that of a silicon input coupler in the prior art. Therefore, the mismatch between the spot size of the input coupler 41 and the fiber spot size can be greatly reduced, and the coupling efficiency can be effectively improved. The input coupler 41 of the first material can achieve a higher coupling efficiency than the silicon input coupler in the prior art.

Further, as shown in FIG. 1, the SOI silicon waveguide structure layer 3 of the phased array LiDAR transmitting chip of mixed materials in the present embodiment includes: a plurality of silicon coupling waveguides 52 of the coupling connection structure 5, phase modulators 31 and an optical antenna 32, where the plurality of silicon coupling waveguides 52 of the coupling connection structure 5, the phase modulators 31 and the optical antenna 32 are connected through silicon waveguides.

Specifically, the plurality of silicon coupling waveguides 52 of the coupling connection structure 5 are at least three silicon coupling waveguides. Each of the phase modulators 31 is configured to change a phase of a light wave coupled into a corresponding silicon waveguide in the SOI silicon waveguide structure layer 3. The optical antenna 32 is configured to transmit phase-changed light waves in silicon waveguides into space.

In this embodiment, the plurality of silicon coupling waveguides 52 of the coupling connection structure 5, the phase modulators 31 and the optical antenna 32 can be optically connected through silicon waveguides. Each phase modulator 31 forms an electrode with a silicon waveguide and adjusts the refractive index of the silicon waveguide by applying current or voltage bias, thereby changing the phase of the light wave in each waveguide. The light waves in the silicon waveguides are adjusted in phase by the phase modulators 31, and then transmitted through the silicon waveguides to the optical antenna 32 and emitted into space.

The SOI silicon waveguide structure layer 3 of the phased array LiDAR transmitting chip of mixed materials in present embodiment includes: a plurality of silicon coupling waveguides 52 of the coupling connection structure 5, phase modulators 31 and an optical antenna 32. The plurality of silicon coupling waveguides 52 of the coupling connection structure 5 is configured to respectively receive light waves split by the first material structure layer. Each of the phase modulator 31 is configured to change the phase of the light wave of a corresponding silicon waveguide in the SOI silicon waveguide structure layer 3. The optical antenna 32 is configured to transmit the phase-changed light waves in the silicon waveguides into space. Therefore, the high-power input light input into the phased array LiDAR transmitting chip of mixed materials can be emitted into space, thereby greatly improving the LiDAR detection performance, and reducing a lot of pressure for the signal detection part.

Second Embodiment

Figure 2:
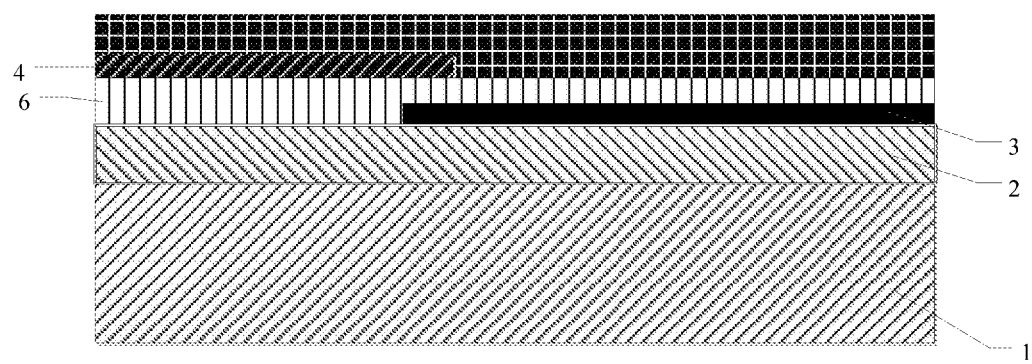
FIG. 2 is a structure diagram of a phased array LiDAR transmitting chip of mixed materials according to a second embodiment of the present disclosure.

FIG. 2 is a structure diagram of a phased array LiDAR transmitting chip of mixed materials according to a second embodiment of the present disclosure. As shown in FIG. 2, the phased array LiDAR transmitting chip provided in this embodiment is based on the phased array LiDAR transmitting chip of mixed materials in the first embodiment of present disclosure, and further includes: a second material layer 6.

Further, in this embodiment, the first material structure layer 4 is located above the SOI silicon waveguide structure layer 3. And the first material structure layer 4 and the SOI silicon waveguide structure layer 3 are separated by the second material layer 6.

A refractive index of the second material layer 6 is lower than that of the first material structure layer 4 and the SOI silicon waveguide structure layer 3.

Specifically, in this embodiment, the first material structure layer 4 and the SOI silicon waveguide structure layer 3 are separated by the second material layer 6. The second material layer 6 has a lower refractive index than both the first material structure layer 4 and the SOI silicon waveguide structure layer 3. The second material layer 6 may be compatible with a CMOS process. For example, the second material layer 6 may be a silicon dioxide layer. In this embodiment, the thickness of the second material layer 6 corresponds to an operating wavelength of the phased array LiDAR transmitting chip. The thickness is approximately the quotient of a quarter of the operating wavelength and the refractive index of the second material. If the operating wavelength of the phased array laser transmitting chip is 1.5 to 1.6 μm, then the thickness of the second material layer 6 can be set as 50 to 500 nm.

Third Embodiment

Figure 3:
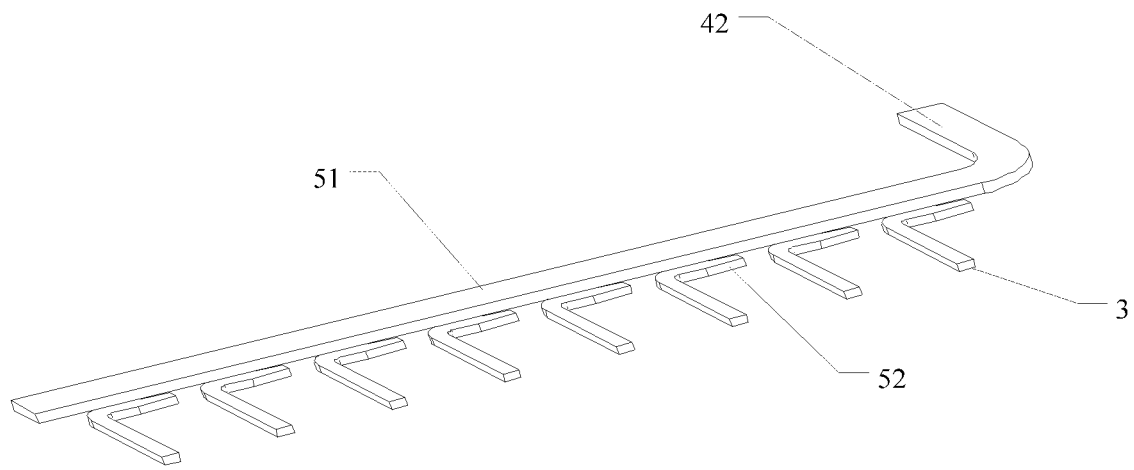
FIG. 3 is a structure diagram of a coupling connection structure of a phased array LiDAR transmitting chip of mixed materials according to a third embodiment of the present disclosure.

FIG. 3 is a structure diagram of a coupling connection structure 5 of a phased array LiDAR transmitting chip of mixed materials according to a third embodiment of the present disclosure. As shown in FIG. 3, in this embodiment, the coupling connection structure 5 includes: a first material coupling waveguide 51 and a plurality of silicon coupling waveguides 52. The first material coupling waveguide 51 is connected to a rear end of the first material backbone waveguide 42, and each of the silicon coupling waveguides 52 is connected to a front end of a corresponding silicon waveguide of the SOI silicon waveguide structure layer 3.

Specifically, the plurality of silicon coupling waveguides 52 are equidistantly arranged directly below the first material coupling waveguide 51 along a direction of light transmission in the first material coupling waveguide 51. A portion of each silicon coupling waveguide 52 where each silicon coupling waveguide 52 is coupled with the first material coupling waveguide 51 has a tapered trapezoidal end, and a taper direction of the tapered end is opposite to the direction of light transmission in the first material coupling waveguide 51.

In this embodiment, the coupling connection structure 5 is in a form of a directional coupler, that is, coupling is performed along a length direction of the first material coupling waveguide 51. The plurality of silicon coupling waveguides 52 having trapezoidal ends are arranged directly below the first material coupling waveguide 51 at the same interval. A mode spot area of the silicon coupling waveguides spot is increased by the trapezoidal part, so that the light wave is coupled from the first material coupling waveguide 51 to the silicon coupling waveguides 52 through the evanescent wave coupling principle.

A width of the trapezoidal end of the silicon coupling waveguide 52 can be determined according to the manufacturing process and processing accuracy. In some embodiments, the width of the trapezoidal end of the silicon coupling waveguide 52 is 100 to 1000 nm.

In some embodiments, a vertical distance between the first material coupling waveguide 51 and each silicon coupling waveguide 52 is 0 to 5 μm.

In some embodiments, a width of the first material coupling waveguide 51 is the same as a width of the first material backbone waveguide 42, and a rear end width of the silicon coupling waveguide 52 is the same as a width of the corresponding silicon waveguide of the SOI silicon waveguide structure layer 3. That is, the width of the first material coupling waveguide 51 and the rear end width of the silicon coupling waveguide 52 are respectively the same as the widths of the respective connected waveguides.

In some embodiments, a width of the silicon waveguides of the SOI silicon waveguide structure layer 3 is 400 nm to 500 nm, and the rear end width of the silicon coupling waveguide 52 is 400 nm to 500 nm.

In some embodiments, a length of an overlapping area of each silicon coupling waveguide 52 and the first material coupling waveguide 51 is 0-100 μm.

In this embodiment, the vertical distance between the first material coupling waveguide 51 and the silicon coupling waveguide 52 can be adjusted by adjusting the thickness of the second material layer 6. And the width of the trapezoidal end of the silicon coupling waveguide 52 and the length of the overlapping region can be adjusted to achieve a coupling spectral ratio of 0 to 100%.

The coupling connection structure 5 of the phased array LiDAR transmitting chip of mixed materials provided in this embodiment includes a first material coupling waveguide 51 and a plurality of silicon coupling waveguides 52. The first material coupling waveguide 51 is connected to a rear end of the first material backbone waveguide 42, and each silicon coupling waveguide 51 is connected to a front end of a corresponding silicon waveguide in the SOI silicon waveguide structure layer 3. The plurality of silicon coupling waveguides 52 are equidistantly arranged, directly below the first material coupling waveguide 51 along a direction of light transmission in the first material coupling waveguide 51. A portion of each silicon coupling waveguide 52 where the silicon coupling waveguide 52 is coupled with the first material coupling waveguide 51 has a tapered trapezoidal end. The taper direction of the tapered end is opposite to the direction of light transmission in the first material coupling waveguide 51. In addition, a vertical distance between the first material coupling waveguide 51 and each silicon coupling waveguide 52, a width of the first material coupling waveguide 51, a rear-end width of the silicon coupling waveguide 52, a width of a trapezoidal end of the silicon coupling waveguide 52, and a length of the overlapping area of the first material coupling waveguide 51 and each silicon coupling waveguide 52 are set to respective preset ranges, which can effectively couple light from the first material waveguide into the silicon waveguides, and can achieve 0-100% optical coupling efficiency.

Fourth Embodiment

This embodiment further refines the first material structure layer and the SOI silicon waveguide structure layer on the basis of the phased array LiDAR transmitting chip of mixed materials provided in the third embodiment of the present disclosure. The phased array LiDAR transmitting chip of mixed materials provided in this embodiment further includes the following solutions.

Each waveguide in the phased array LiDAR transmitting chip of mixed materials can be a single-mode waveguide of a TE mode.

Specifically, in this embodiment, waveguides in the first material structure layer, waveguides in the SOI silicon waveguide structure layer, and waveguides in the coupling connection structure can all be single-mode waveguides in a TE mode.

Further, in this embodiment, the input coupler 41 can be an end-face coupler or a grating coupler.

Specifically, in this embodiment, an end coupler or a grating coupler can be selected to couple light to the chip, and then a light wave is transmitted to the coupling connection structure 5 through a single-mode waveguide of TE mode. When the light is divided into a plurality of light waves, each light wave can be transmitted normally in the silicon waveguide, and then coupled from the first material waveguide into the silicon waveguides of the SOI silicon waveguide structure layer 3.

Further, in this embodiment, the phase modulator 31 may be an electro-optic phase modulator or a thermo-optic phase modulator.

Specifically, in this embodiment, the phase modulator 31 is an electro-optic phase modulator or a thermo-optic phase modulator. The electro-optic phase modulator, and the thermo-optic phase modulator of a two-side heating type or a single-side heating type are referred to as a first phase modulator, while the thermo-optic phase modulator of a top heating type is referred to as a second phase modulator. The structure of the electro-optic phase modulator is as follows: ion implantation is performed on silicon flat plates on both sides of a silicon waveguide in the SOI silicon waveguide structure layer 3 to form a PIN junction or a PN junction with the silicon waveguide; and when a current is passed, a refractive index of silicon can be adjusted by the current, thereby changing the phase of a light wave in each silicon waveguide. The thermo-optic phase modulator can be a top heating type, a single-side heating type or a two-side heating type, that is, the heating electrode is located on the top, one single side or both sides of the silicon waveguide. After the current or voltage is biased, the heat generated by the heating electrode will be transferred to the silicon waveguide. Since silicon is a material with a high thermo-optic coefficient, it is easy to change the refractive index in the waveguide, thereby changing the phase of the light wave in each waveguide. It should be noted that if the heating electrode is too close to the waveguide, it will absorb the light wave in the waveguide and cause a large loss. In order to reduce this loss, the heating electrode needs to be a certain distance away from the waveguide, which is generally greater than 2 μm. The materials of the heating electrode and metal lead are not limited in the embodiment, but generally the resistivity of the heating electrode is larger than the metal lead by an order of magnitude.

In the phased array LiDAR transmitting chip of mixed materials provided in this embodiment, the input phase coupler 41 is an end-face coupler or a grating coupler, and the phase modulator 31 is an electro-optic phase modulator or a thermo-optic phase modulator, which enables the phased array LiDAR transmitting chip of mixed materials to present in various types and meet various requirements of different devices.

Further, in this embodiment, the optical antenna 32 can be a grating-type optical antenna array.

Specifically, in this embodiment, the light wave in each silicon waveguide is phase-adjusted by the phase modulator 31 and transmitted by the silicon waveguide to the optical antenna 32 to be emitted into space. In this embodiment, the optical antenna 32 is a second-order diffraction grating engraved on a silicon waveguide array, that is, a grating-type optical antenna array 32. Specific parameters of the grating, such as grating period, duty cycle, and etch depth, are related to the operating wavelength. When performing grating etching on a silicon waveguide, the grating period needs to be calculated first according to the etching depth. In order to obtain a small far-field divergence angle along the direction of the silicon waveguide and a high longitudinal LiDAR scanning resolution, the etching depth of the second-order diffraction grating of the optical antenna 32 should be designed to be shallow, 20 to 100 nm. Because the optical wavelength band is 1.5 to 1.6 μm, the effective refractive index of the silicon waveguide array for this band is about 2.38. According to the formula of the second-order diffraction grating, it is found that the period of the second-order diffraction grating is 600 to 680 nm, that is, the grating is etched on the silicon waveguide uniformly at a distance of the grating period. A width of the grating is determined by a duty cycle, where the duty cycle is a ratio of the grating width to the grating period. It can be known from calculation that when the optical wavelength band is 1.5 to 1.6 μm and the duty ratio of the second-order diffraction grating is 0.4 to 0.6, the external radiation efficiency can reach the highest.

Because a waveguide pitch of the optical antenna 32 determines the maximum scanning angle of the final phased array LiDAR transmitting chip, so in this embodiment, the silicon waveguide pitch of the optical antenna 32 is 500 nm to 2.5 μm. The distribution form of the silicon waveguide of the optical antenna 32 is not limited in the embodiment. The distribution form can be a uniform distribution, or a gaussian distribution, a sinusoidal distribution, or other nonuniform distribution forms.

Further, in this embodiment, the phased array LiDAR transmitting chip of mixed materials may further includes a protective layer.

Specifically, the protective layer can cover the entire phased array LiDAR transmitting chip of mixed materials. The protective layer may be a low refractive index protective layer. The material of the low-refractive-index protective layer may be silicon dioxide, and the thickness may be 2 to 5 μm.

Further, in this embodiment, after the electrodes of the phased array LiDAR transmitting chip of mixed materials are set, windows are opened above the electrodes and the grating of the optical antenna for power input and light input and output. The windows above the grating of the optical antenna 32 may be approximately 2 μm from the grating.

Fifth Embodiment

The fifth embodiment of the present disclosure provides a phased array LiDAR. The phased array LiDAR includes the phased array LiDAR transmitting chip of mixed materials according to any one of the first to fourth embodiments of the present disclosure.

The structure and function of the phased array LiDAR transmitting chip of mixed materials of the phased array LiDAR in this embodiment are similar to those of the phased array LiDAR transmitting chip of mixed materials in any one of the first to fourth embodiments of the present disclosure, which will not be described here again.

In this embodiment, a light source may be a laser coupled to a phased array LiDAR transmitting chip of mixed materials, or a laser bonded to the chip, but the linewidth of the laser wavelength should be narrow enough, and the coherence length of its output light should be greater than twice the range to be measured, or the laser uses a narrow pulse light source with a pulse width of less than 100 microseconds. Regarding which kind of light source to be specifically used, this can be determined according to the ranging scheme. The detector of the phased array LiDAR can be either an off-chip detector or a detector integrated on the chip, which is not limited in this embodiment.

Sixth Embodiment

Figure 4:
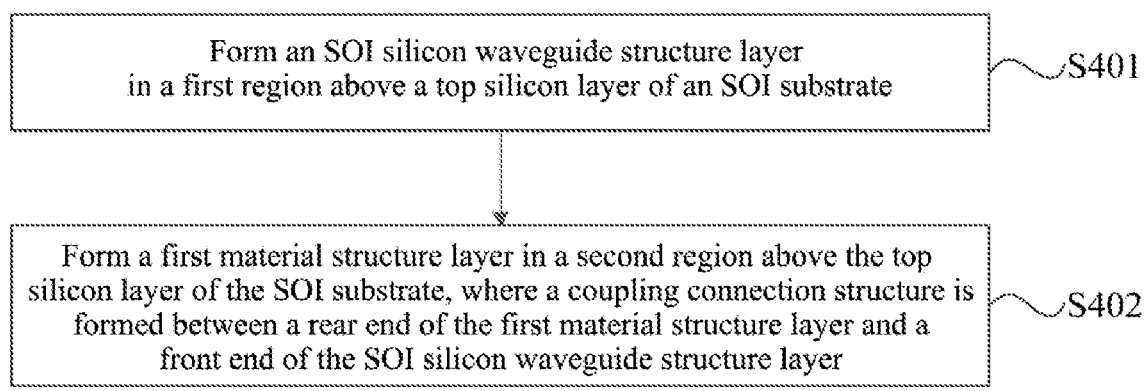
FIG. 4 is a flow diagram of a method for manufacturing a phased array LiDAR transmitting chip of mixed materials according to a sixth embodiment of the present disclosure.

FIG. 4 is a flow chart of a method for manufacturing a phased array LiDAR transmitting chip of mixed materials according to a sixth embodiment of the present disclosure. As shown in FIG. 4, the method for manufacturing a phased array LiDAR transmitting chip of mixed materials provided in this embodiment includes the following steps.

Step 401: form an SOI silicon waveguide structure layer 3 in a first region 30 above a top silicon layer of an SOI substrate.

Specifically, in this embodiment, a waveguide pattern of the SOI silicon waveguide structure layer 3 can be transferred to the top silicon layer of the SOI substrate by using an electron beam exposure process or a stepper lithography process, and the SOI silicon waveguide structure layer 3 can be etched in the first region 30 by using an ICP etching process. Other processes can also be used to form the SOI silicon waveguide structure layer 3 in the first region 30 above the top silicon layer of the SOI substrate, which is not limited in this embodiment.

Here, the first region 30 can be located at a rear end on the top silicon layer of the SOI substrate.

Step 402: form a first material structure layer 4 in a second region 40 above the top silicon layer of the SOI substrate, where a coupling connection structure 5 is formed between a rear end of the first material structure layer 4 and a front end of the SOI silicon waveguide structure layer 3.

Specifically, in this embodiment, a waveguide pattern of the first material structure layer 4 can be transferred to the first material structure layer 4 by using the electron beam exposure process or the step lithography process, and the first material structure layer 4 can be etched in the second region 40 by using the ICP etching process. Other processes may also be used to form the first material structure layer 4 in the second region 40 above the top silicon layer of the SOI substrate, which is not limited in this embodiment.

Here, the second region 40 can be located at a front end of the top silicon layer of the SOI substrate. And projection areas of the first region 30 and the second region 40 overlap each other to form the coupling connection structure 5.

It should be understood that the first region 30 can also be located at the front end on the top silicon of the SOI substrate, and accordingly, the second region 40 can be located at the rear end on the top silicon of the SOI substrate, and a projection area of the first region 30 and the second region 40 overlap each other to form the coupling connection structure 5.

In this embodiment, the first material structure layer 4 includes: an input coupler 41, a first material backbone waveguide 42, and a first material coupling waveguide 51 of the coupling connection structure 5. A front waveguide pattern in the first material structure layer 4 forms the input coupler 41, and a rear waveguide pattern forms the first material backbone waveguide 42 and the first material coupling waveguide 51 of the coupling connection structure 5. The input coupler 41 is configured to couple input light to a chip. The first material backbone waveguide 42 is configured to transmit a light wave to the first material coupling waveguide 51 of the coupling connection structure 5.

A non-linear refractive index of the first material in the first material structure layer 4 is lower than that of silicon, and the first material may be a material compatible with a CMOS process.

In this embodiment, when the SOI silicon waveguide structure layer 3 and the first material structure layer 4 are formed, the SOI silicon waveguide structure layer 3 and the first material structure layer 4 are not on the same horizontal plane. The SOI silicon waveguide structure layer 3 may be either below the first material structure layer 4 or above the first material structure layer 4, so that a coupling connection structure 5 is formed between the rear end of the first material structure layer 4 and the front end of the SOI silicon waveguide structure layer 3.

The coupling connection structure 5 includes: a first material coupling waveguide 51 and a plurality of silicon coupling waveguides 52. The first material coupling waveguide 51 is connected to a rear end of the first material backbone waveguide 42, and each of the silicon coupling waveguides 52 is connected to a front end of a corresponding silicon waveguide in the SOI silicon waveguide structure layer 3. The plurality of silicon coupling waveguides 52 are equidistantly arranged directly below the first material coupling waveguide 51 along a direction of light transmission in the first material coupling waveguide 51. A portion of each silicon coupling waveguide 52 where each silicon coupling waveguide 52 is coupled with the first material coupling waveguide 51 has a tapered trapezoidal end, and a taper direction of the tapered end is opposite to the direction of light transmission in the first material coupling waveguide 51.

The method for manufacturing a phased array LiDAR transmitting chip of mixed materials provided in this embodiment can be applied to manufacture the phased array LiDAR transmitting chip of mixed materials in the first embodiment of the present disclosure. The structure and function of the phased array LiDAR transmitting chip of mixed materials of this embodiment are the same as those of the first embodiment, and thus will not be described here again.

Seventh Embodiment

Figure 5:
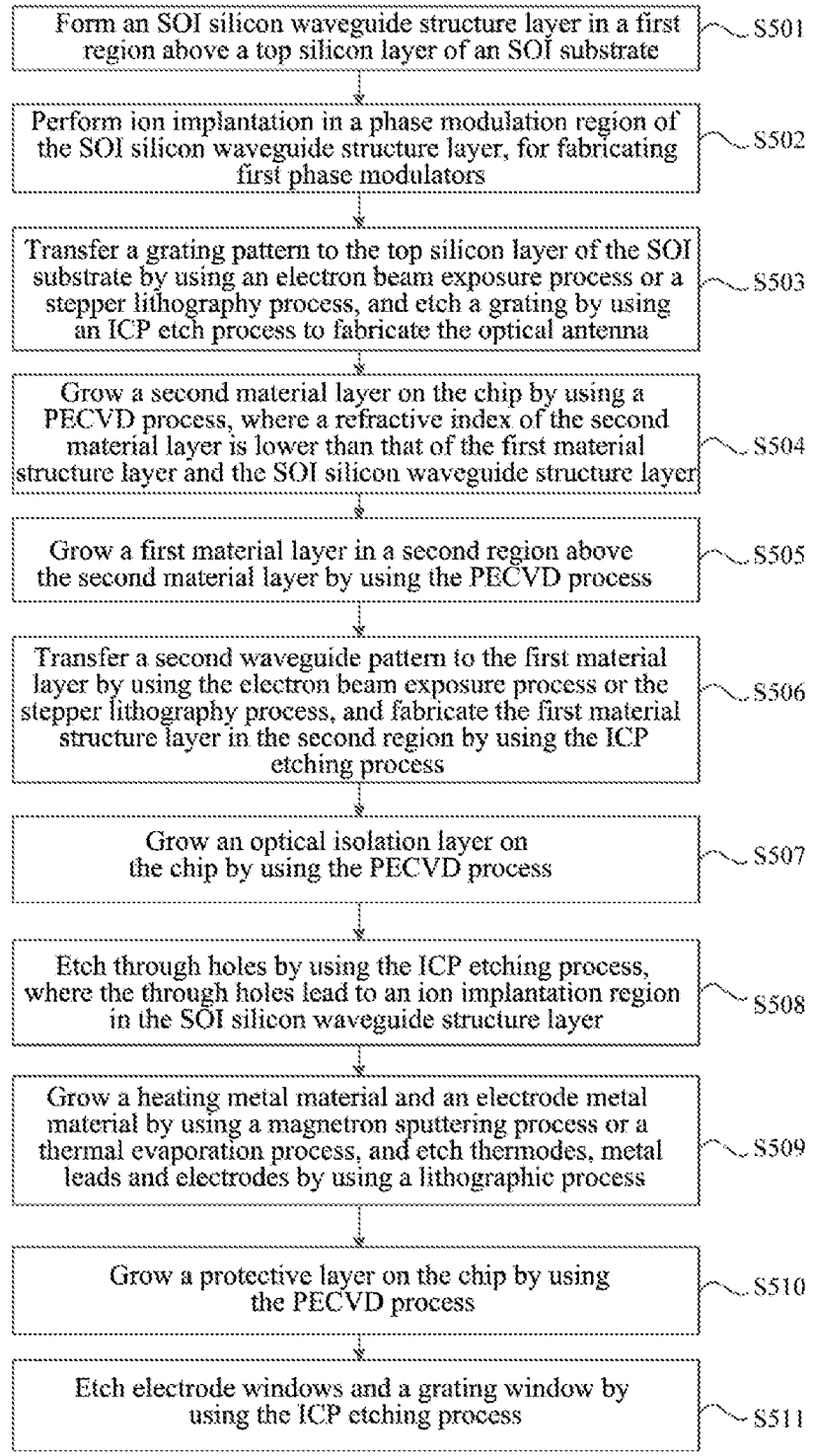
FIG. 5 is a flow diagram of a method for manufacturing a phased array LiDAR transmitting chip of mixed materials according to a seventh embodiment of the present disclosure.

FIG. 5 is a flow chart of a method for manufacturing a phased array LiDAR transmitting chip of mixed materials according to a seventh embodiment of the present disclosure. As shown in FIG. 5, the method for manufacturing a phased array LiDAR transmitting chip of mixed materials provided in this embodiment is based on the method provided in the sixth embodiment, and further refines the steps 401 and 402 and added some other steps. The method for manufacturing a phased array LiDAR transmitting chip of mixed materials according to this embodiment includes a following steps.

Step 501: form an SOI silicon waveguide structure layer 3 in a first region 30 above a top silicon layer of an SOI substrate.

With reference to FIG. 1 and FIG. 3, an SOI silicon waveguide structure layer 3 includes a plurality of silicon coupling waveguides 52, phase modulators 31 and an optical antenna 32.

Figure 7:
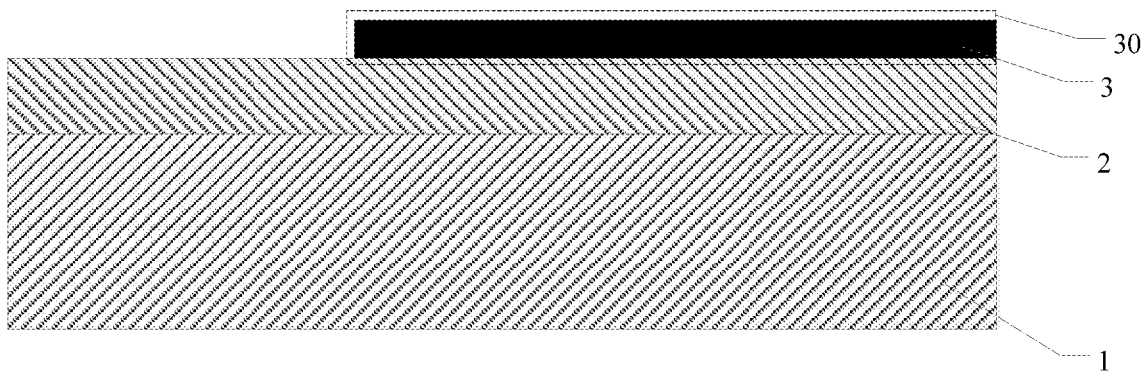
FIG. 7 is a structure diagram after step 501 of the method for manufacturing a phased array LiDAR transmitting chip of mixed materials according to the seventh embodiment of the present disclosure is executed.

FIG. 6 is a structure diagram of an SOI substrate according to the seventh embodiment of the present disclosure. FIG. 7 is a structure diagram after step 501 of the method for manufacturing a phased array LiDAR transmitting chip of mixed materials according to the seventh embodiment of the present disclosure is executed. As shown in FIG. 7, a first waveguide pattern is transferred to the top silicon layer of the SOI substrate by using an electron beam exposure process or a stepper lithography process and the SOI silicon waveguide structure layer 3 is etched in the first region 30 by using an ICP etching process to form the plurality of silicon coupling waveguides 52, and waveguide part of the phase modulators 31 and the optical antenna 32.

The first waveguide pattern constitutes the waveguide pattern of the SOI silicon waveguide structure layer 3. The first region 30 is a rear-end region located above the top silicon layer of the SOI substrate.

Step 502: perform ion implantation in a phase modulation region of the SOI silicon waveguide structure layer 3, for fabricating first phase modulators 31 which are usually electro-optic phase modulators, or thermo-optic phase modulators of a two-side heating type or a single-side heating type. If the chip does not use the first phase modulators, but uses the second phase modulators, this step needs not to be performed.

The first region 30 includes a phase modulation region, and the phase modulation region is located at a middle part of the first region 30.

Step 503: transfer a grating pattern to the top silicon layer of the SOI substrate by using an electron beam exposure process or a stepper lithography process, and etch a grating 7 by using an ICP etching process to fabricate the optical antenna 32.

Figure 8:
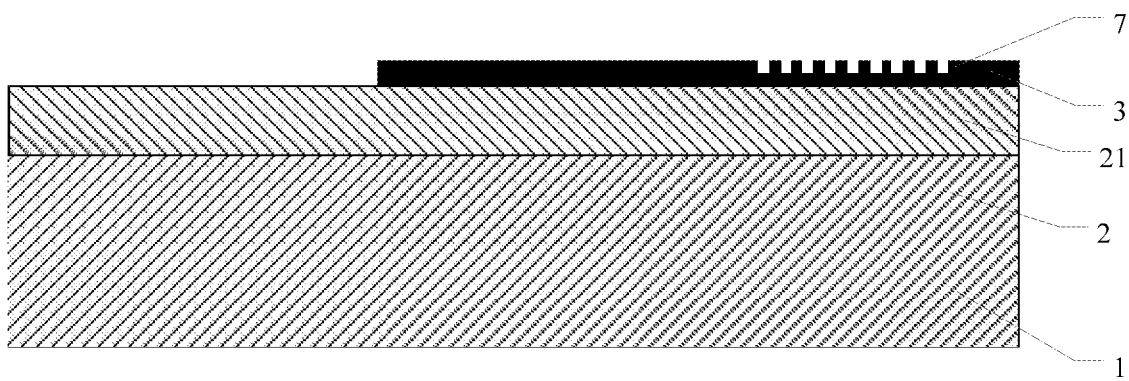
FIG. 8 is a structure diagram after step 503 of the method for manufacturing a phased array LiDAR transmitting chip of mixed materials according to the seventh embodiment of the present disclosure is executed.

FIG. 8 is a structure diagram after step 503 of the method for manufacturing a phased array LiDAR transmitting chip of mixed materials according to the seventh embodiment of the present disclosure is executed. As shown in FIG. 8, the grating 7 is located at the rear end of the first region 30.

The front end of the SOI silicon waveguide structure layer 3 is silicon waveguides connected to the coupling connection structure 5. The silicon waveguides first pass through curved silicon waveguides to increase spacings between the silicon waveguides in the region of the phase modulators 31, thereby achieving thermal or electrical isolation, then pass through curved silicon waveguides to reach a waveguide region of the optical antenna 32 with the waveguide spacing reduced to 500 nm to 2.5 μm.

Step 504: grow a second material layer 6 on the chip by using a PECVD process, where a refractive index of the second material layer 6 is lower than that of the first material structure layer 4 and the SOI silicon waveguide structure layer 3.

Figure 9:
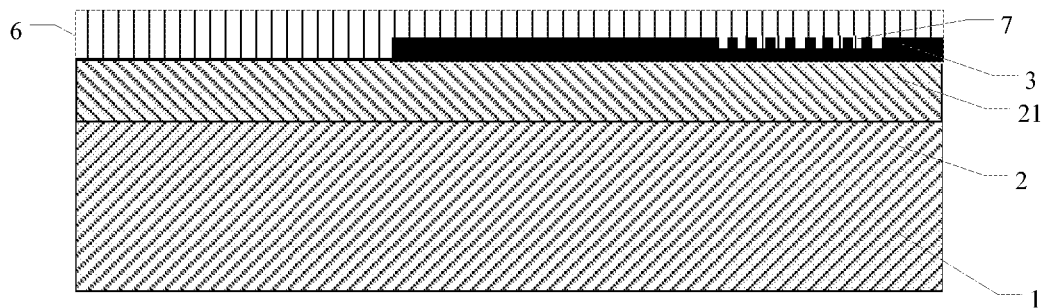
FIG. 9 is a structure diagram after step 504 of the method for manufacturing a phased array LiDAR transmitting chip of mixed materials according to the seventh embodiment of the present disclosure is executed.

FIG. 9 is a structure diagram after step 504 of the method for manufacturing a phased array LiDAR transmitting chip of mixed materials according to the seventh embodiment of the present disclosure is executed. As shown in FIG. 9, the second material layer 6 is covered over the chip, and the second material layer 6 may be compatible with the CMOS process. For example, the second material layer 6 may be a silicon dioxide layer.

Step 505: grow a first material layer in a second region 40 above the second material layer 6 by using the PECVD process.

Step 506: transfer a second waveguide pattern to the first material layer by using the electron beam exposure process or the stepper lithography process, and fabricate the first material structure layer in the second region by using the ICP etching process.

Figure 10:
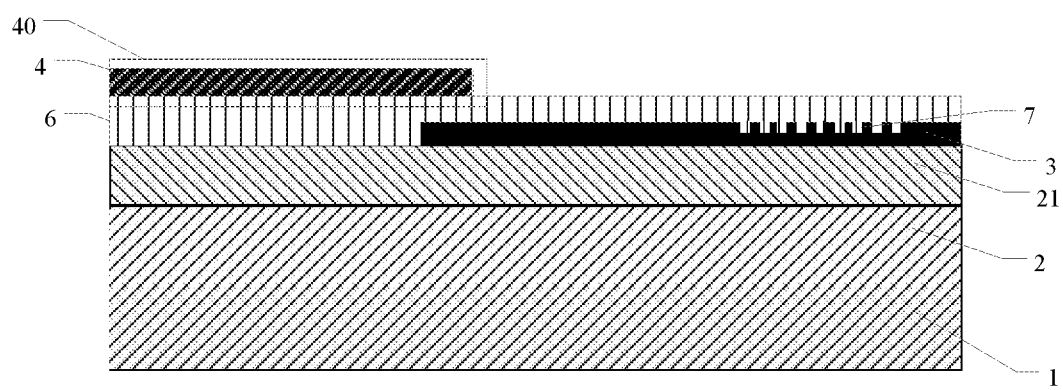
FIG. 10 is a structure diagram after step 506 of the method for manufacturing a phased array LiDAR transmitting chip of mixed materials according to the seventh embodiment of the present disclosure is executed.

FIG. 10 is a structure diagram after step 506 of the method for manufacturing a phased array LiDAR transmitting chip of mixed materials according to the seventh embodiment of the present disclosure is executed. As shown in FIG. 10, the second region 40 is a front-end region above the second material layer 6, and the second waveguide pattern constitutes a waveguide pattern in the first material structure layer 4. The first material structure layer 4 and the SOI silicon waveguide structure layer 3 are separated by the second material layer 6, and the first material structure layer 4 is located above the SOI silicon waveguide structure layer 3.

With reference to FIG. 1 and FIG. 3, the first material structure layer 4 includes an input coupler 41, a first material backbone waveguide 42 and a first material coupling waveguide 51, and the first material coupling waveguide 51 overlaps with the plurality of silicon waveguide 52 to form a coupling connection structure 5.

Step 507: grow an optical isolation layer 8 on the chip by using the PECVD process.

Figure 11:
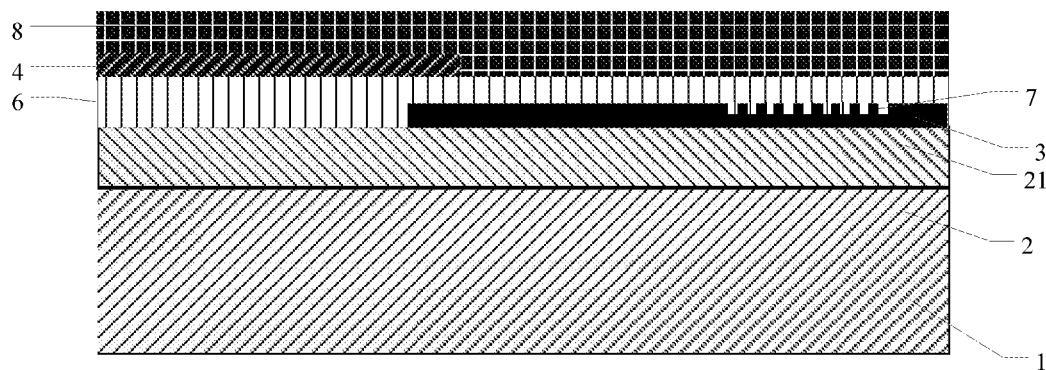
FIG. 11 is a structure diagram after step 507 of the method for manufacturing a phased array LiDAR transmitting chip of mixed materials according to the seventh embodiment of the present disclosure is executed.

FIG. 11 is a structure diagram after step 507 of the method for manufacturing a phased array LiDAR transmitting chip of mixed materials according to the seventh embodiment of the present disclosure is executed. As shown in FIG. 11, the optical isolation layer 8 covers the entire chip.

A material of the optical isolation layer 8 may be a silicon dioxide material.

Step 508: etch through holes by using the ICP etching process, where the through holes lead to the ion implantation region in the SOI silicon waveguide structure layer, and in combination with subsequently fabricated metal leads and electrodes, form the first phase modulators. This step is performed cooperatively with step 502, to form the first phase modulators. If the chip does not use the first phase modulators but uses the second phase modulators, this step needs not to be performed.

Step 509: grow a heating metal material and an electrode metal material by using a magnetron sputtering process or a thermal evaporation process, and etch thermodes 10, metal leads 11 and electrodes 9 by using a lithographic process, to form second phase modulators. If the chip does not use the second phase modulators but use the first phase modulators, this step needs not to be performed.

The type of the phase modulators can be selected according to a specific application requirement.

Figure 12:
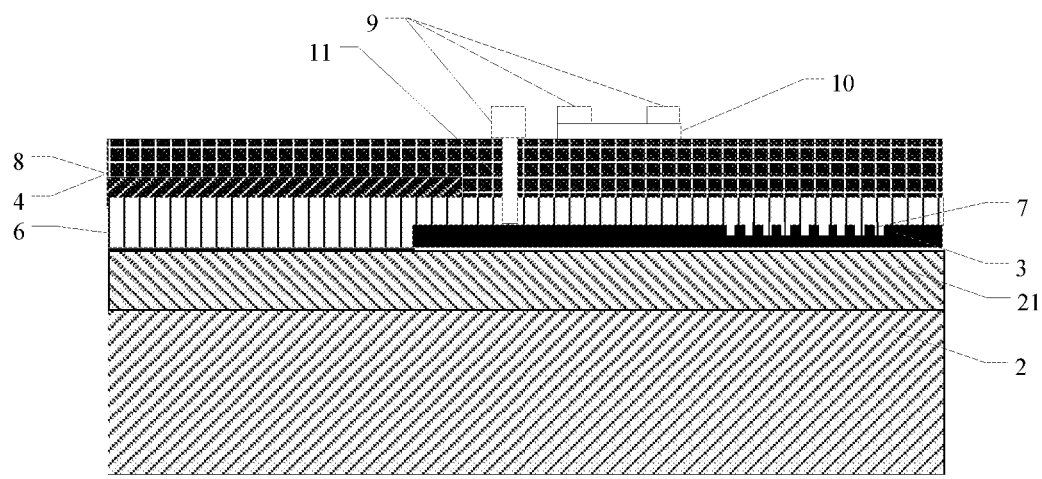
FIG. 12 is a structure diagram after step 509 of the method for manufacturing a phased array LiDAR transmitting chip of mixed materials according to the seventh embodiment of the present disclosure is executed.

FIG. 12 is a structure diagram after step 509 of the method for manufacturing a phased array LiDAR transmitting chip of mixed materials according to the seventh embodiment of the present disclosure is executed. As shown in FIG. 12, in this embodiment, in a region of the optical isolation layer located directly above of the phase modulation region in the SOI silicon waveguide structure layer, the heating metal material and the electrode metal material are grown by using a magnetron sputtering process or a thermal evaporation process, and thermodes 10, metal leads 11 and electrodes 9 are etched by using a lithographic process to form thermooptic phase modulators of a top heating type. Materials of the thermodes 10 and the metal leads 11 are not limited herein. The resistivity of the thermodes 10 may be one order of magnitude greater than the resistivity of the metal leads 11.

Step 510: grow a protective layer 12 on the chip by using the PECVD process.

The material of the protective layer 12 can be silicon dioxide.

Step 511: etch electrode windows 13 and a grating window 14 by using the ICP etching process.

Figure 13:
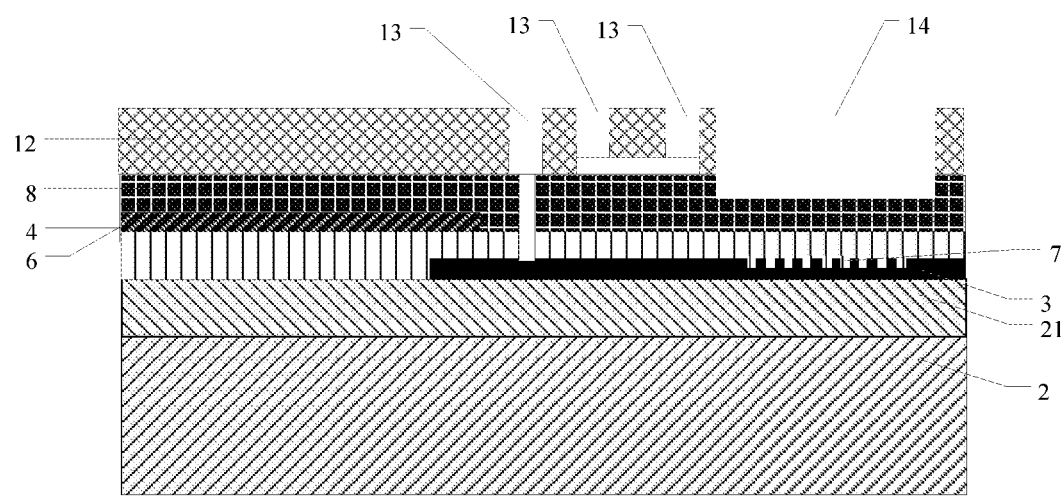
FIG. 13 is a structure diagram after step 511 of the method for manufacturing a phased array LiDAR transmitting chip of mixed materials according to the seventh embodiment of the present disclosure is executed.

FIG. 13 is a structure diagram after step 511 of the method for manufacturing a phased array LiDAR transmitting chip of mixed materials according to the seventh embodiment of the present disclosure is executed. As shown in FIG. 13, the protective layer 12 covers the entire chip, the electrode window 13 is located above the electrode, and the grating window 14 is located above the grating.

The method for manufacturing a phased array LiDAR transmitting chip of mixed materials provided in this embodiment can be applied to manufacturing the phased array LiDAR transmitting chip of mixed materials in the fourth embodiment of the present disclosure, where the structure and function of the phased array LiDAR transmitting chip of mixed materials in this embodiment are the same as those of the fourth embodiment, and thus will not be described here again.

Finally, it should be noted that the above embodiments are only used to describe the technical solutions of the present disclosure, but not to limit them; Although the present disclosure has been described in detail with reference to the foregoing embodiments, those of ordinary skill in the art should understand that the technical solutions described in the foregoing embodiments can still be modified, and that some or all of the technical features can be replaced equivalently; however, these modifications or replacements do not make the essence of the corresponding technical solutions deviate from the scope of the technical solutions of the embodiments in the present disclosure.

What is claimed is:

1. A phased array light detection and ranging (LiDAR) transmitting chip of mixed materials, comprising: a first material structure layer and an SOI silicon waveguide structure layer, wherein an overlapping region of a rear end of the first material structure layer and a front end of the SOI silicon waveguide structure layer forms a coupling connection structure;
   the first material structure layer is optically connected to the SOI silicon waveguide structure layer through the coupling connection structure;
   the first material structure layer is configured to couple input light to the chip;
   the coupling connection structure is configured to split a light wave coupled into the chip, and couple each of split light waves into a corresponding silicon waveguide in the SOI silicon waveguide structure layer; and
   a non-linear refractive index of a first material in the first material structure layer is lower than a non-linear refractive index of a silicon material.

2. The phased array LiDAR transmitting chip of mixed materials according to claim 1, wherein the SOI silicon waveguide structure layer comprises: a plurality of silicon coupling waveguides of the coupling connection structure, phase modulators and an optical antenna;
   the plurality of silicon coupling waveguides of the coupling connection structure, the phase modulators and the optical antenna are connected through silicon waveguides;
   each of the phase modulators is configured to change a phase of a light wave coupled into a corresponding silicon waveguide in the SOI silicon waveguide structure layer; and
   the optical antenna is configured to transmit phase-changed light waves in silicon waveguides into space.

3. The phased array LiDAR transmitting chip of mixed materials according to claim 1, wherein the first material structure layer is located above the SOI silicon waveguide structure layer, and the first material structure layer and the SOI silicon waveguide structure layer are separated by a second material layer;

wherein a refractive index of the second material layer is lower than that of the first material structure layer and the SOI silicon waveguide structure layer.

4. The phased array LiDAR transmitting chip of mixed materials according to claim 1, wherein the first material structure layer comprises: an input coupler, a first material backbone waveguide, and a first material coupling waveguide of the coupling connection structure;

the input coupler is optically connected to the first material coupling waveguide of the coupling connection structure through the first material backbone waveguide;

the input coupler is configured to couple the input light into the first material backbone waveguide; and the first material backbone waveguide is configured to transmit a light wave to the first material coupling waveguide of the coupling connection structure.

5. The phased array LiDAR transmitting chip of mixed materials according to claim 4, wherein the first material coupling waveguide is connected to a rear end of the first material backbone waveguide, and each silicon coupling waveguide is connected to a front end of a corresponding silicon waveguide of the SOI silicon waveguide structure layer;

the plurality of silicon coupling waveguides are equidistantly arranged directly below the first material coupling waveguide, along a direction of light transmission in the first material coupling waveguide; and a portion of each silicon coupling waveguide where the each silicon coupling waveguide is coupled with the first material coupling waveguide has a tapered trapezoidal end, and a taper direction of the tapered end is opposite to the direction of light transmission in the first material coupling waveguide.

6. The phased array LiDAR transmitting chip of mixed materials according to claim 5, wherein a vertical distance between the first material coupling waveguide and each silicon coupling waveguides is 0 to 5 μm;

a width of the trapezoidal end of each silicon coupling waveguide is 100 to 1000 nm;

a width of the first material coupling waveguide is the same as a width of the first material backbone waveguide, and a rear end width of each silicon coupling waveguide is the same as a width of the corresponding silicon waveguide of the SOI silicon waveguide structure layer; and a length of an overlapping region of each silicon coupling waveguide and the first material coupling waveguide is 0 to 100 μm.

7. A phased array LiDAR device, comprising the phased array LiDAR transmitting chip of mixed materials according to claim 1.

8. A method for manufacturing the phased array LiDAR transmitting chip of mixed materials according to claim 1, comprising:

forming an SOI silicon waveguide structure layer in a first region above a top silicon layer of an SOI substrate, wherein the SOI silicon waveguide structure layer comprises a plurality of silicon coupling waveguides, phase modulators and an optical antenna;

forming a first material structure layer in a second region above the top silicon layer of the SOI substrate, wherein the first material structure layer comprises an input coupler, a first material backbone waveguide and a first material coupling waveguide and, and the first material coupling waveguide overlaps with the plurality of silicon coupling waveguides to form a coupling connection structure;

wherein, a non-linear refractive index of a first material in the first material structure layer is lower than that of silicon.

9. The method according to claim 8, wherein the forming an SOI silicon waveguide structure layer in a first region above a top silicon layer of an SOI substrate, comprises:

transferring a first waveguide pattern to the top silicon layer of the SOI substrate by using an electron beam exposure process or a stepper lithography process, and etching the SOI silicon waveguide structure layer in the first region by using an inductively coupled plasma (ICP) etching process to form the plurality of silicon coupling waveguides and waveguide part of the phase modulators and the optical antenna.

10. The method according to claim 9, the forming an SOI silicon waveguide structure layer in a first region above a top silicon layer of an SOI substrate, further comprises:

transferring a grating pattern to the top silicon layer of the SOI substrate by using the electron beam exposure process or the stepper lithography process, and etching a grating by using the ICP etching process to fabricate the optical antenna.

11. The method according to claim 10, wherein after transferring the grating pattern to the top silicon layer of the SOI substrate by using the electron beam exposure process or the stepper lithography process, and etching the grating layer to manufacture the optical antenna by using the ICP etching process, the method further comprises:

growing a second material layer on the chip by using a plasma enhanced chemical vapor deposition (PECVD) process, wherein the first material structure layer is located above the SOI silicon waveguide structure layer, and the first material structure layer and the SOI silicon waveguide structure layer are separated by the second material layer;

wherein a refractive index of the second material layer is lower than that of the first material structure layer and the SOI silicon waveguide structure layer.

12. The method according to claim 11, wherein the forming a first material structure layer in a second region above the top silicon layer of the SOI substrate, comprises:

growing a first material layer in the second region above the second material layer by using the PECVD process;

transferring a second waveguide pattern to the first material layer by using the electron beam exposure process or the stepper lithography process, and fabricating the first material structure layer in the second region by using the ICP etching process, to form the input coupler, the first material backbone waveguide and the first material coupling waveguide.

13. The method according to claim 12, wherein before growing the second material layer on the chip by using the PECVD process, the method further comprises:

performing ion implantation in a phase modulation region of the SOI silicon waveguide structure layer, for fabricating first phase modulators;

wherein, after transferring the second waveguide pattern to the first material layer by using the electron beam exposure process or the stepper lithography process, and fabricating the first material structure layer in the second region by using the ICP etching process, the method further comprises:

growing an optical isolation layer on the chip by using the PECVD process;

etching through holes by using the ICP etching process, wherein the through holes lead to an ion implantation region in the SOI silicon waveguide structure layer, and growing an electrode metal material by using a magnetron sputtering process or a thermal evaporation process, and etching metal leads and electrodes by using a lithographic process to form the first phase modulators;

growing a protective layer on the chip by using the PECVD process; and etching electrode windows and a grating window by using the ICP etching process.

14. The method according to claim 12, wherein after forming the first material structure layer in the second region above the top silicon layer of the SOI substrate, the method further comprises:

growing an optical isolation layer on the chip by using the PECVD process;

growing a heating metal material and an electrode metal material by using a magnetron sputtering process or a thermal evaporation process, and etching thermodes, metal leads and electrodes by using a lithographic process, to form second phase modulators;

growing a protective layer on the chip by using the PECVD process; and etching electrode windows and a grating window by using the ICP etching process.

* * * * *